(12) United States Patent
Aufiero

(10) Patent No.: US 12,305,604 B2
(45) Date of Patent: May 20, 2025

(54) HYDROELECTRIC UNIT, SUBMERSIBLE HYDRAULIC ASSEMBLY COMPRISING SAID HYDROELECTRIC UNIT AND ENERGY STORAGE PLANT COMPRISING SAID HYDROELECTRIC UNIT

(71) Applicant: SIZABLE ENERGY S.R.L., Milan (IT)

(72) Inventor: Manuele Aufiero, Milan (IT)

(73) Assignee: Sizable Energy S.r.l., Milan (IT)

( * ) Notice: Subject to any disclaimer, the term of this patent is extended or adjusted under 35 U.S.C. 154(b) by 20 days.

(21) Appl. No.: 18/037,725

(22) PCT Filed: Nov. 19, 2021

(86) PCT No.: PCT/IB2021/060756
§ 371 (c)(1),
(2) Date: May 18, 2023

(87) PCT Pub. No.: WO2022/107070
PCT Pub. Date: May 27, 2022

(65) Prior Publication Data
US 2023/0417212 A1    Dec. 28, 2023

(30) Foreign Application Priority Data
Nov. 20, 2020    (IT) ........................ 102020000027951

(51) Int. Cl.
*F03B 13/10*    (2006.01)
*F03B 3/10*    (2006.01)
(Continued)

(52) U.S. Cl.
CPC .............. *F03B 13/10* (2013.01); *F03B 3/103* (2013.01); *F03B 13/06* (2013.01); *F03B 13/08* (2013.01);
(Continued)

(58) Field of Classification Search
CPC .......... F03B 3/103; F03B 13/06; F03B 13/08; F03B 13/10; H02K 7/1823; H02K 21/14; F05B 2220/32; F05B 2220/7068
See application file for complete search history.

(56) References Cited

U.S. PATENT DOCUMENTS 7,385,303 B2 *    6/2008    Roos ..................... F03B 13/105
                                                                    290/54
8,536,723 B2 *    9/2013    Roos ........................ F03B 3/18
                                                                    290/55
(Continued)

FOREIGN PATENT DOCUMENTS

WO    WO 2012/008938 A1    1/2012

OTHER PUBLICATIONS

PCT International Search Report and Written Opinion dated Feb. 7, 2022 for PCT Application No. PCT/IB2021/060755.
(Continued)

*Primary Examiner* — Tulsidas C Patel
*Assistant Examiner* — Thomas K Quigley
(74) *Attorney, Agent, or Firm* — McCarter & English, LLP

(57) ABSTRACT

An hydroelectric unit extends along a longitudinal axis and includes a least one rim-driven hydraulic machine comprising an impeller provided with at least two blades, and at least one motor/generator configured to selectively supply mechanical energy to the impeller or convert mechanical energy produced by the impeller into electricity. The motor/generator includes an annular rotor arranged about the impeller and an annular stator arranged, at a distance, about the annular rotor; the annular rotor being coupled to the impeller and including a plurality of rotor poles, which are distributed along an annular surface, are arranged parallel one to another and extend transversal to a plane containing the longitudinal axis forming a first angle with the plane
(Continued)

containing the longitudinal axis. The annular stator includes a plurality of stator windings and a plurality of stator slots configured to guide the magnetic flux and to house respective stator windings. The stator slots are arranged parallel one to another and extend transversal to a plane containing the longitudinal axis forming a second angle with the plane containing the longitudinal axis.

26 Claims, 6 Drawing Sheets

(51) Int. Cl.
    *F03B 13/06*     (2006.01)
    *F03B 13/08*     (2006.01)
    *F03B 17/06*     (2006.01)
    *H02K 7/18*     (2006.01)
    *H02K 21/14*     (2006.01)

(52) U.S. Cl.
    CPC ........... *F03B 17/06* (2013.01); *H02K 7/1823* (2013.01); *H02K 21/14* (2013.01); *F05B 2220/32* (2013.01); *F05B 2220/7068* (2013.01); *H02K 2213/03* (2013.01)

(56) References Cited

U.S. PATENT DOCUMENTS

| | | | |
|---|---|---|---|
| 8,963,356 B2* | 2/2015 | Roos | F03B 13/083 |
| | | | 290/52 |
| 12,034,338 B2* | 7/2024 | Fratila | H02K 29/03 |
| 2007/0145751 A1* | 6/2007 | Roos | F03B 13/105 |
| | | | 290/52 |
| 2010/0181771 A1* | 7/2010 | Roos | H02K 7/1823 |
| | | | 290/52 |
| 2012/0098369 A1 | 4/2012 | Auten | |
| 2012/0169054 A1* | 7/2012 | Roos | H02K 7/14 |
| | | | 290/52 |
| 2012/0175885 A1 | 7/2012 | Peer | |
| 2013/0119800 A1 | 5/2013 | Husband et al. | |
| 2021/0119506 A1* | 4/2021 | Fratila | H02K 29/03 |

OTHER PUBLICATIONS

PCT/IB2021/060756, Nov. 19, 2021, WO 2022/107070 A1 published May 27, 2022.

* cited by examiner

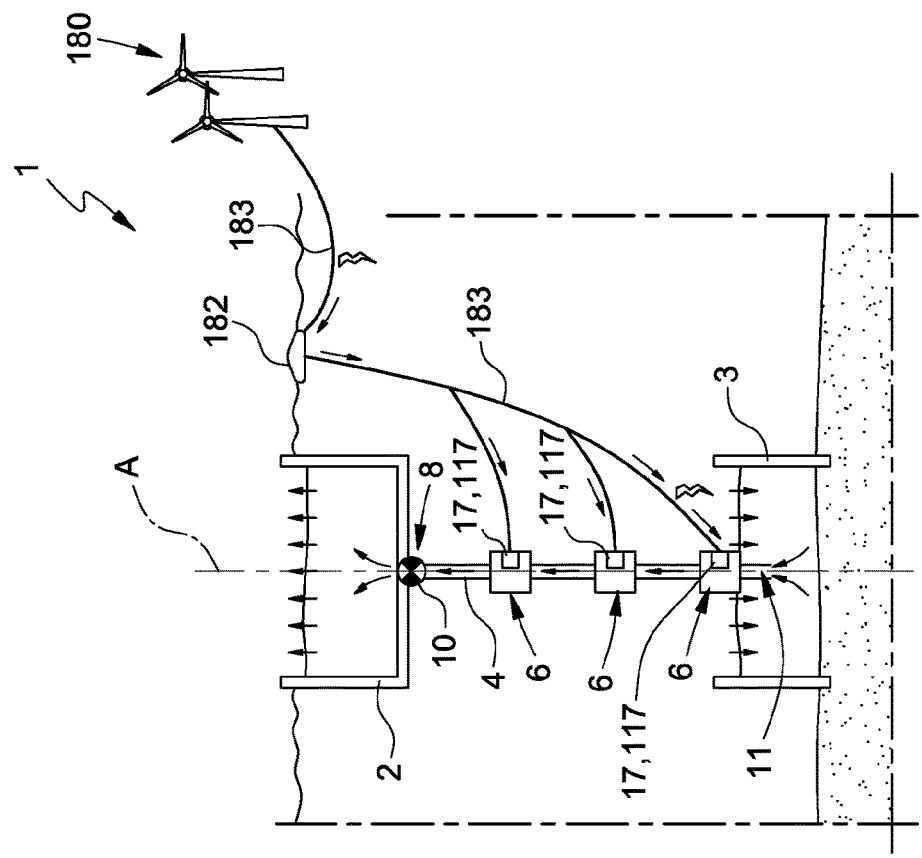
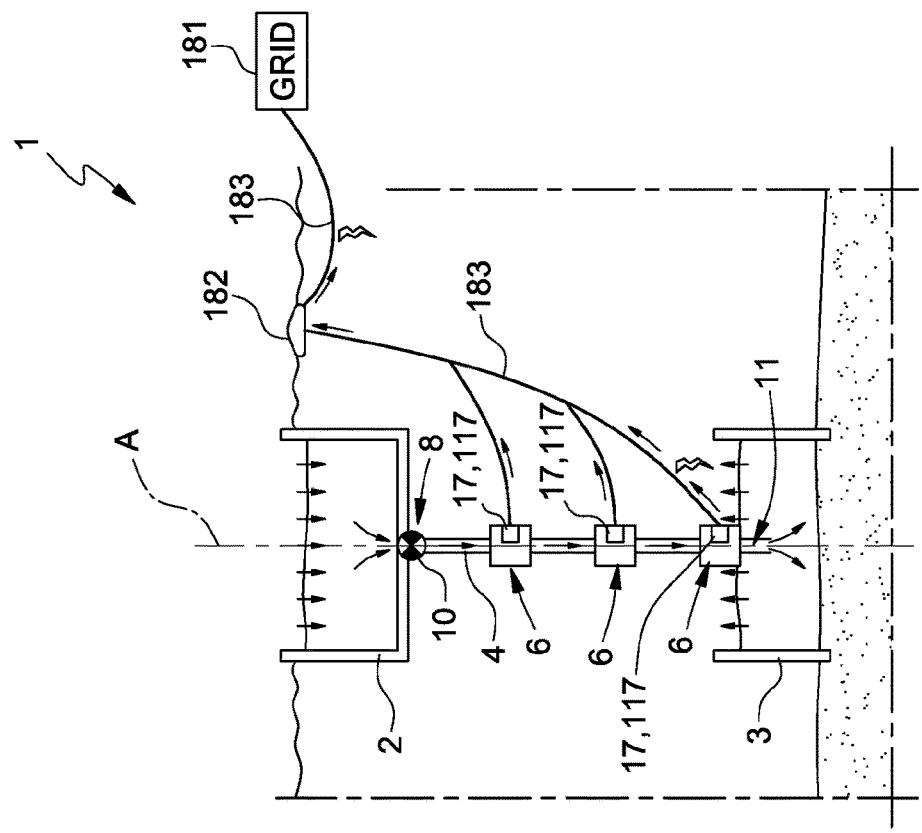

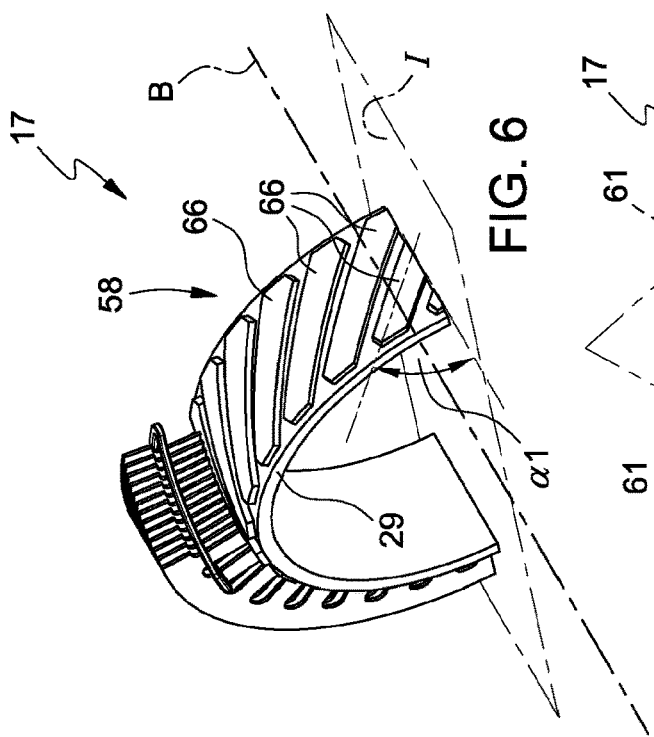
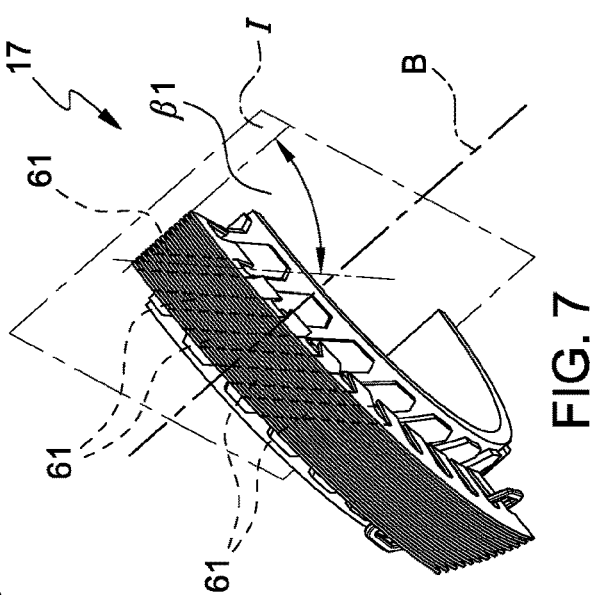
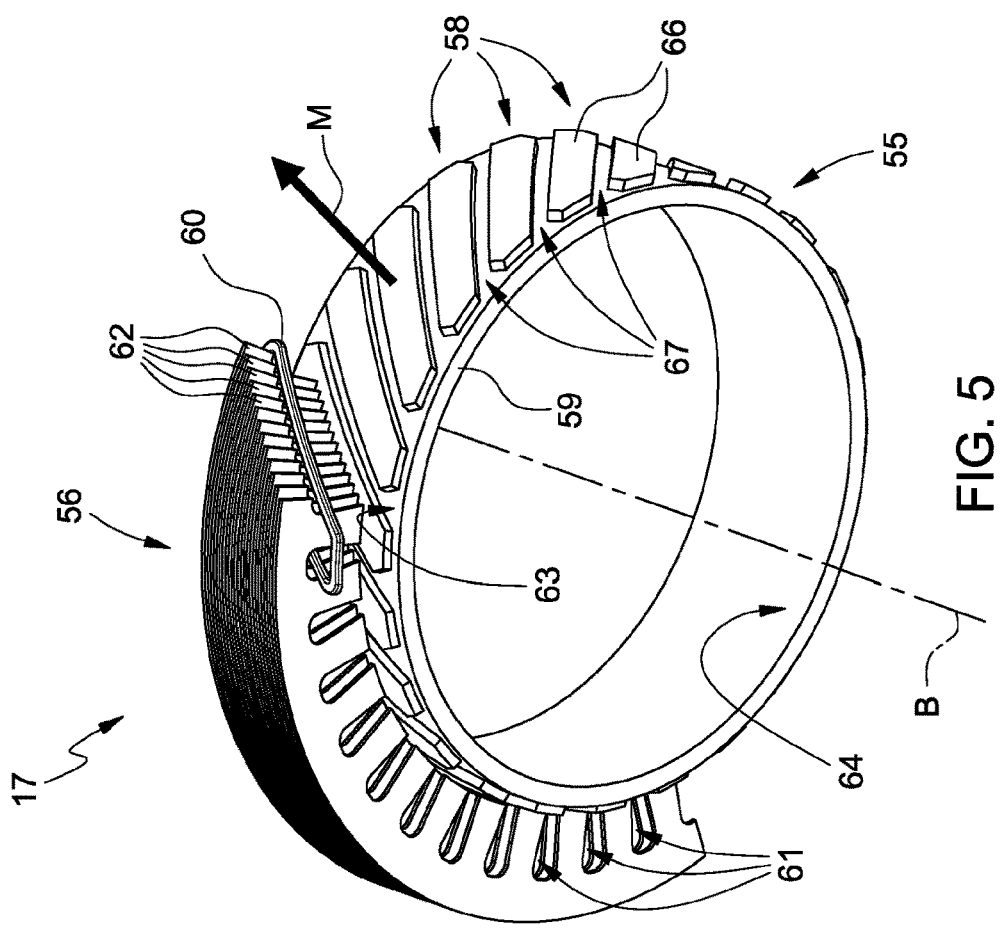

HYDROELECTRIC UNIT, SUBMERSIBLE HYDRAULIC ASSEMBLY COMPRISING SAID HYDROELECTRIC UNIT AND ENERGY STORAGE PLANT COMPRISING SAID HYDROELECTRIC UNIT

CROSS-REFERENCE TO RELATED APPLICATIONS

This Patent Application is a 35 U.S.C. § 371 National Stage filing of International Application No. PCT/IB2021/060756, filed on Nov. 19, 2021, which Application claims priority from Italian Patent Application No. 102020000027951 filed on Nov. 20, 2020, the entire disclosures of which is are incorporated herein by reference.

TECHNICAL FIELD

The present invention relates to a hydroelectric unit, preferably for submersible applications. The present invention further relates to a submersible hydraulic assembly comprising said hydroelectric unit and to an energy storage plant comprising said hydroelectric unit.

BACKGROUND

As is known, energy storage plants are essential for storing excess energy produced by intermittent energy sources (such as solar, wind energy plants) and other renewables, or excess energy produced by continuous base-load sources (such as coal or nuclear). Energy storage plants, in fact, are used for saving energy for periods of higher demand.

One of the most common kinds of energy storage plants is the hydroelectric energy storage plant.

Hydroelectric energy storage plants store energy in the form of gravitational potential energy of a working fluid (generally water), pumped from a lower elevation reservoir to a higher elevation (generally a reservoir too).

In use, the surplus electric power is used to run a pumping system to store the working fluid; while during periods of high electrical demand, the stored water is released and a turbine generating system produces electric power.

Normally, these hydroelectric storage plants are arranged onshore exploiting elevation differences in mountains or hills. Recently, off-shore adoption of the pumped-hydro energy storage concept in seas/oceans or in lakes is being considered.

Deployment, maintenance and service operations on this new kind of offshore storage plants are certainly not simple as most of the components are submersed underwater.

Therefore, it is desirable to avoid maintenance and replacement of components as much as possible.

Shaftless, rim-drive thrusters and straflo turbines, pumps and pump/turbines offer several advantages and are adopted in water vehicles. In these hydraulic machines the axial loads generated by the interaction between the flow and the impeller act on the thrust bearings, usually placed in the hub or radially in case of hubless configurations.

Thrust bearings repair and replacement is one of the causes of machine downtime and maintenance cost.

SUMMARY

The object of the present invention is therefore to provide a hydroelectric unit which enables avoiding or at least mitigating the described drawbacks.

In particular, it is an object of the present invention to provide a hydroelectric unit, which is reliable and, at the same time, simple and economic to realize.

According to the present invention, there is provided a hydroelectric unit extending along a longitudinal axis and comprising:
  at least one rim-driven hydraulic machine comprising an impeller provided with at least two blades;
  at least one motor/generator configured to selectively supply mechanical energy to the impeller or convert mechanical energy produced by the impeller into electricity; the motor/generator comprising an annular rotor arranged about the impeller and an annular stator arranged, at a distance, about the annular rotor; the annular rotor being coupled to the impeller and comprising a plurality of rotor poles, which are distributed along an annular surface, are arranged parallel one to another and extend transversal to a plane containing the longitudinal axis forming a first angle with the plane containing the longitudinal axis; the annular stator comprising a plurality of stator windings and a plurality of stator slots configured to guide the magnetic flux and to house respective stator windings; the stator slots being arranged parallel one to another and extending transversal to a plane containing the longitudinal axis forming a second angle with the plane containing the longitudinal axis.

A further object of the present invention is to provide a submersible hydraulic assembly which is reliable and, at the same time, simple and economic to realize.

According to the present invention, there is provided a submersible hydraulic assembly as claimed in claim 25.

A further object of the present invention is to provide an energy storage plant reliable and, at the same time, simple and economic to realize.

According to the present invention, there is provided an energy storage plant as claimed in claim 26.

BRIEF DESCRIPTION OF THE DRAWINGS

The present invention will now be described with reference to the accompanying drawings, which illustrate some non-limitative embodiment, in which:

FIG. 1 is a schematic representation of an energy storage plant according to the present invention, with parts removed for clarity, in a discharging operation mode;

FIG. 2 is a schematic representation of an energy storage plant, with parts removed for clarity, according to the present invention in a charging operation mode;

FIG. 5 is a perspective view, with parts removed for clarity, of a first detail of the hydroelectric unit of FIG. 4;

FIGS. 6 and 7 are different perspective section views of the first detail of FIG. 5;

DETAILED DESCRIPTION OF EXEMPLARY EMBODIMENTS

Figure 3:
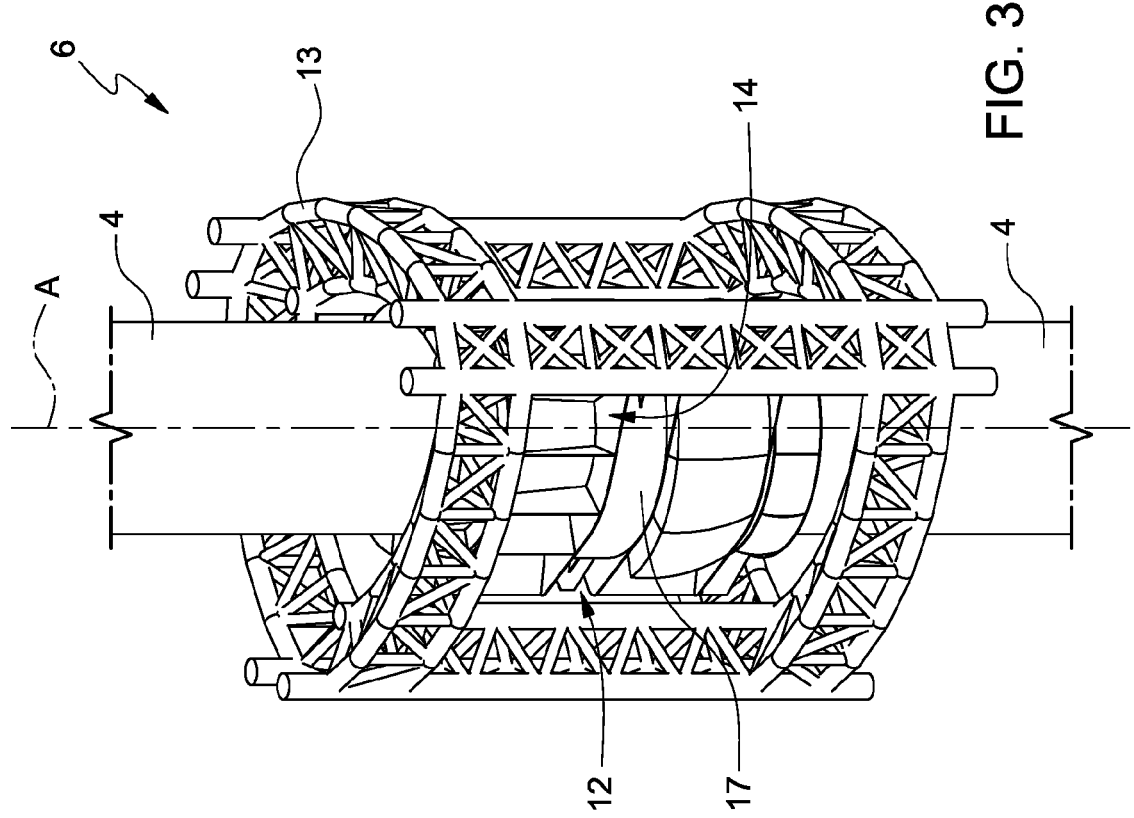
FIG. 3 is a perspective schematic representation of a submersible hydraulic assembly comprising an hydroelectric unit for an energy storage plant, with parts removed for clarity, according to the present invention.

In FIGS. 1 and 2 reference numeral 1 indicates an energy storage plant according to the present invention.

The energy storage plant 1 comprises at least one head reservoir 2, at least one bottom reservoir 3, at least one connecting conduit 4 fluidly connecting the head reservoir 2 and the bottom reservoir 3, and at least one submersible hydraulic assembly 6 arranged along the connecting conduit 4.

The head reservoir 2 and the bottom reservoir 3 are configured to store a working liquid.

The head reservoir 2 is arranged at a first elevation and the bottom reservoir 3 is arranged at a second elevation lower than the first elevation.

The bottom reservoir 3 is submersed in a body of environmental liquid, generally water in marine/natural basin application (sea water or lake water). In the following, the body of environmental liquid will be defined as body of water.

In the non-limitative example here disclosed and illustrated, the bottom reservoir 3 lays on the bed of the body of water.

The head reservoir 2 can be buoyant or can be fixed on shore or can be submersed too. Preferably, the head reservoir 2 is connected to cables (not shown in the attached figures) anchored to the bed of the body of water or to any other fixed structure (natural or artificial) to compensate movements due to the body of water or due to the changes of load.

In the non-limitative example here disclosed and illustrated, the working liquid is denser than the water of the body of water. According to a variant not shown the working liquid can be less dense than the water of the body of water.

Preferably, the liquid arranged in the head reservoir 2 and in the bottom reservoir 3 have a pressure very close to the one of the surrounding environment. This can be achieved, for example, by inletting or outletting liquid to compensate pressure changes. In this way, advantages in terms of choice of materials and of the structures of the reservoirs to be used are evident.

Both head reservoir 2 and bottom reservoir 3 can be selectively connected with the body of water, preferably to regulate the pressure inside them.

Head reservoir 2 is provided with one opening 8 connected to the connecting conduit 4 and, preferably, with one valve 10 arranged at the opening 8 to regulate the flow of working fluid.

Bottom reservoir 3 is provided with one opening 11 connected to the connecting conduit 4. In the connecting conduit 4 the working liquid flows up and down through the at least one hydraulic assembly 6.

In the non-limiting example here disclosed and illustrated, the energy storage plant 1 comprises a plurality of hydraulic assemblies 6 arranged in series along the connecting conduit 4. With reference to FIG. 3, each hydraulic assembly 6 comprises at least one hydroelectric unit 12 (better visible in the following figures) and a frame 13 configured to house the hydroelectric unit 12.

In use, the connecting conduit 4 extends substantially along a longitudinal axis A. The longitudinal axis A is preferably arranged vertically. However, it is clear that the longitudinal axis can move from the vertical position, for example due to the wave motion of the body of water in which the connecting conduit 4 is submersed.

Each frame 13 of each hydraulic assembly 6 is connected by at least one cable or chain (not illustrated) to a respective frame 13 of an adjacent hydraulic assembly 6 or to the head reservoir 2 or to the bottom reservoir 3 or to an intermediate structure coupled to the head reservoir 2 or to the bottom reservoir 3 or to other support or mooring structures.

The hydroelectric unit 12 of the hydraulic assembly 6 comprises a hydraulic machine 14 and a motor/generator 17.

Preferably, the hydraulic machine 14 is directly connected to the motor/generator 17.

The hydraulic machine 14 can be can be selected in the group comprising a pump, a turbine, a reversible pump/turbine, a thruster.

In the example here disclosed and illustrated, the hydraulic machine 14 is a reversible axial flow pump/turbine. In other words, the hydraulic machine 14 can act as a pump or, alternatively, as a turbine. Advantageously, the axial flow pump/turbine can be arranged directly along the connecting conduit 4 without the need of flow deviations.

The motor/generator 17 is configured to selectively supply mechanical energy (motor mode) or to convert mechanical energy into electricity (generator mode).

Figure 4:
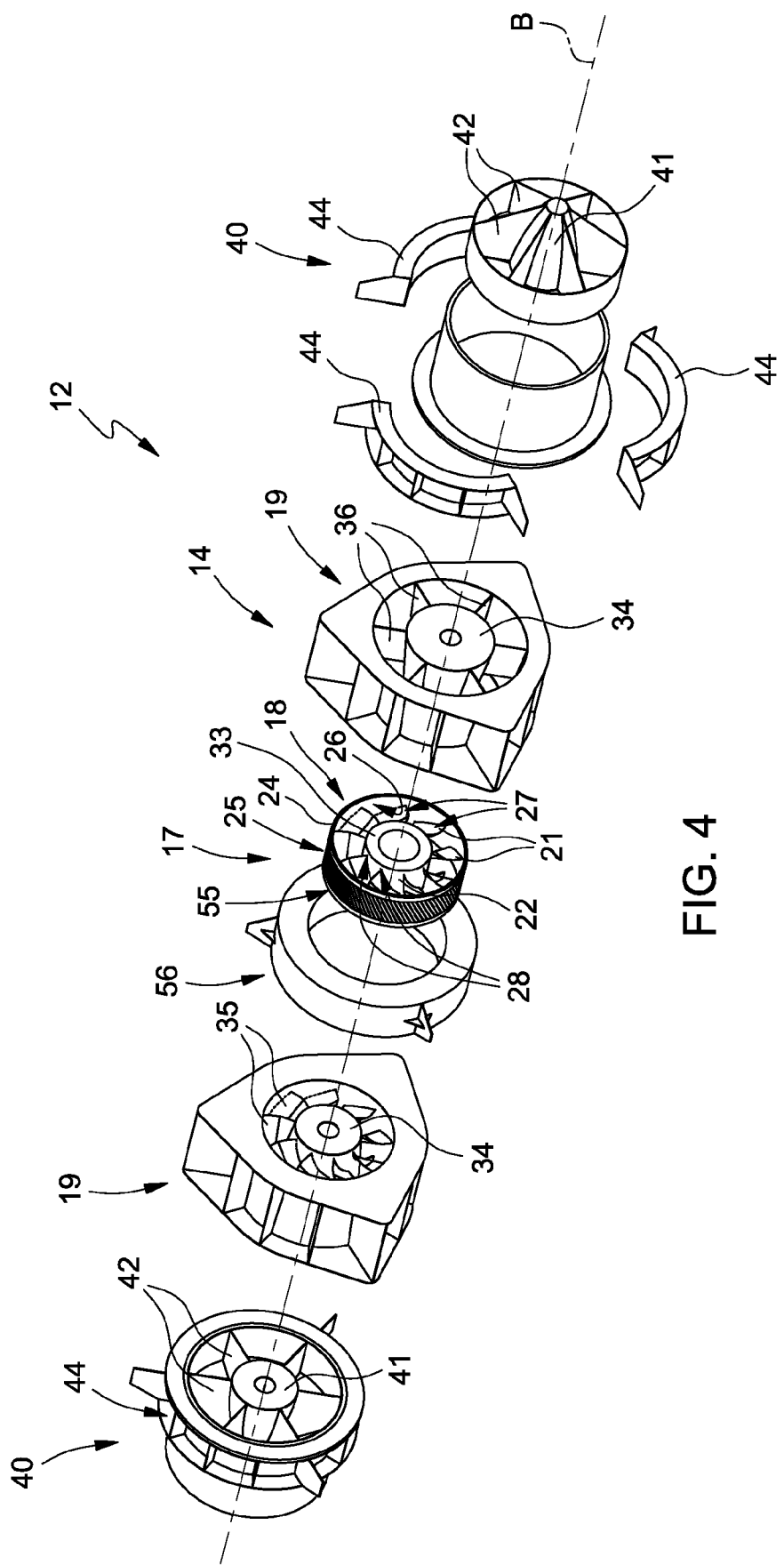
FIG. 4 is an exploded perspective view, with parts removed for clarity, of a hydroelectric unit according to the present invention.

With reference to FIG. 4, the hydraulic machine 14 extends along an axis B which, in use, is substantially coincident with the longitudinal axis A.

The hydraulic machine 14 is preferably of the rim-driven type and is shaft-less.

The hydraulic machine 14 comprises an impeller 18 and, preferably, also two distributors 19, between which the impeller 18 is arranged. The distributors 19 and the impeller 18 are coaxially arranged.

The impeller 18 comprise a plurality of blades 21, radially arranged with respect to axis B and, preferably, an hollow hub 22, which is centrally arranged in the impeller 18.

In particular, the impeller 18 comprises an annular casing 24 provided with an outer surface 25 and an inner surface 26. The blades 21 protrude radially from the inner surface 26 of the annular casing 24.

Blades 21 have one end 27 rigidly coupled to the annular casing 24 and one end 28 radially opposite to the end 27. In the example here illustrated, the end 28 is coupled to the hollow hub 22.

The hollow hub 22 defines a buoyancy chamber (not visible), which can be filled with a buoyancy element (not visible).

In the non-limiting example here disclosed and illustrated, the buoyancy element is a polymer foam, preferably polyurethane foam. The buoyancy of the buoyancy element is adjusted so as to provide an axial load (i.e along the longitudinal axis B) opposed to the natural load acting on the impeller 18.

In the non-limiting example here disclosed and illustrated, the hollow hub 22 houses also two annular thrust bearings 33 (only one of them is schematically represented in FIG. 4) which are arranged at the opposite axial ends of the hollow hub 22.

Further bearings (not illustrated) are radially arranged.

The annular thrust bearings 33 are preferably water lubricated thrust bearing.

Preferably, in some embodiments, the annular casing 24 of the impeller 18 is made of aluminium or other non-magnetic material, in order to minimize the magnetic flux leakages from the motor/generator 17.

Each distributor 19 is provided with a central fixed body 34 and with guide vanes 35 (preferably regulating guide vanes) arranged in an annular channel and opportunely oriented to give the required direction to the working liquid flow towards the impeller 18. The distributors 19 are also provided with fixed radial supports 36. Guide vanes 35 (only visible in the distributor 19 arranged on the left in FIG. 4) and fixed radial supports 36 (only visible in the distributor 19 arranged on the right in FIG. 4) are arranged at different axial positions in the annular channel.

In use, the annular thrust bearings 33 face the respective central fixed bodies 34 of the distributors 19.

Preferably, each distributor 19 of the hydraulic machine 14 is connected to a respective coupling portion of the connecting conduit 4 by a connector 40. The connectors 40 here disclosed and illustrated also perform the function of guiding the flow of the working liquid towards the distributors 19. In particular, each connector 40 is provided with a hollow central body 41, preferably ogive-shaped, fixed struts 42 annularly arranged about the hollow central body 41 and at least two outer flanges 44 (three in the example here illustrated) configured to clamp the coupling portion of the connecting conduit 4.

The motor/generator 17 is arranged about the impeller 18 and is configured to selectively supply mechanical energy to the impeller 18 or to convert mechanical energy produced by the impeller 18 into electricity.

In particular, the motor/generator 17 comprises an annular rotor 55 coupled to the impeller 18 and an annular stator 56 arranged, at a distance, about the rotor 55.

With reference to FIGS. 5, 6 and 7, the annular rotor 55 comprises a plurality of rotor poles 58 and a back ring 59, while the annular stator 56 comprises a plurality of stator windings 60 (not all visible in the attached figures) and a plurality of stator slots 61 (not all visible in the attached figures) configured to guide the magnetic flux and to house respective stator windings 60.

In particular, the annular stator 56 comprises a plurality of laminations 62, which are stacked along the longitudinal axis B and are shaped to define the plurality of stator slots 61.

The back ring 59 is provided with a ring outer surface 63 and a ring inner surface 64. The ring inner surface 64 is coupled to the outer surface 25 of the annular casing 24 of the impeller 18 (not shown in FIGS. 5-7).

The rotor poles 58 are distributed along the ring outer surface 63 and are arranged parallel one to another.

Each rotor pole 58 is configured to have a magnetization direction M extending along a radial direction with respect to the longitudinal axis B, as shown in FIG. 5.

Preferably, the rotor poles 58 comprise permanent magnets 66, which are arranged on the ring outer surface 63 protruding from said ring outer surface 63.

Permanent magnets 66 are arranged at a distance one from the other, leaving a gap 67 between them.

Permanent magnets 66 are preferably substantially parallelepiped block shape having radial dimensions lower than circumferential and axial dimensions.

With particular reference to FIG. 6, the rotor poles 58 are arranged parallel one to another and extend transversal to a plane I containing the longitudinal axis B forming a first angle α1 with said plane containing the longitudinal axis B. Preferably, the rotor poles 58 are also transversal to a plane orthogonal to the longitudinal axis B.

In the non-limiting example here disclosed and illustrated, the permanent magnets 66 are arranged parallel one to another and extend transversal to a plane I containing the longitudinal axis B forming a first angle α1 with said plane containing the longitudinal axis B.

In the non-limiting example here disclosed and illustrated, the first angle α1 is measured substantially at half the axial length of the rotor 55. In other words, the first angle α1 is measured substantially in correspondence of a median plane transverse to the longitudinal axis A and separating the rotor 55 in two substantially equal parts.

Depending on the geometric configuration of rotor poles 58 (e.g. non-helix configurations), in fact, the first angle α1 may vary along the axial direction.

With particular reference to FIG. 7, the stator slots 61 are arranged parallel one to another and extend transversal to the plane I containing the longitudinal axis B forming a second angle β1 with said plane I containing the longitudinal axis B. Preferably, the stator slots 61 are also transversal to a plane orthogonal to the longitudinal axis B.

In the non-limiting example here disclosed and illustrated, the first angle α1 and the second angle 31 angle are substantially identical. With the definition "substantially identical" is intended that the difference between the first angle α1 and the second angle 31 can be comprised in a range ±5°.

According to a variant not shown the difference between the first angle α1 and the second angle β1 may be adjusted in order to mitigate the torque and axial load ripples. For example, the difference between the first angle α1 and the second angle β1 can be adjusted in a range ±10°.

The first angle α1 and the second angle 31 are defined so that magnetic interaction between the stator 56 and the rotor 55 of the generator/motor 17 create a generator axial load (i.e along the longitudinal axis B) on the impeller 18 that opposes to the natural axial load created by hydrodynamic forces acting on the blades 21 of the impeller 18 during the operation of the hydroelectric unit 12 itself in nominal operating conditions or in a selected set of operating regimes.

Therefore, the configuration of the rotor 55 and of the stator 56 creates a counterforce that axially de-loads the impeller 18 of the hydraulic machine 14 during its operation.

Preferably, the first angle α1 and the second angle β1 are defined to create a generator axial load on the impeller 18, which has substantially a value at least equal to 50% of the module of the natural axial load.

More preferably the first angle α1 and the second angle 31 are defined to create a generator axial load on the impeller 18, which has substantially a value equal to the module of the natural axial load.

The first angle α1 and the second angle 31 are calculated as a function of the torque of the motor/generator 17 in a selected operating regime and of the dimensions of the rotor 55.

In particular, the first angle α1 and the second angle 31 are calculated according the following formula:

$$\frac{\alpha 1 + \beta 1}{2} \geq \tan^{-1}\left(\frac{R}{\tau} \cdot \frac{1}{2}L\right)$$

wherein:
R is the average radius of the gap between the stator 56 and the rotor 55 measured at the rotor poles 58;
τ is the torque of the motor/generator 17 in a selected operating regime;
L is the natural axial load acting on the impeller 18 in a selected operating regime.

In the non-limiting example here disclosed and illustrated, wherein the first angle α1 and the second angle β1 are defined to create a generator axial load on the impeller 18, which has substantially a value equal to the module of the natural axial load, the first angle α1 and the second angle β1 are calculated according the following formula:

$$\frac{\alpha 1 + \beta 1}{2} \cong \tan^{-1}\left(\frac{R}{\tau} \cdot L\right)$$

In particular, with the expression "substantially equal" is intended that the first angle α1 and the second angle β1 satisfy the following condition:

$$\tan^{-1}\left(\frac{R}{\tau} \cdot L \cdot 0, 9\right) \le \frac{\alpha 1 + \beta 1}{2} \le \tan^{-1}\left(\frac{R}{\tau} \cdot L \cdot 1.1\right)$$

Figure 9:
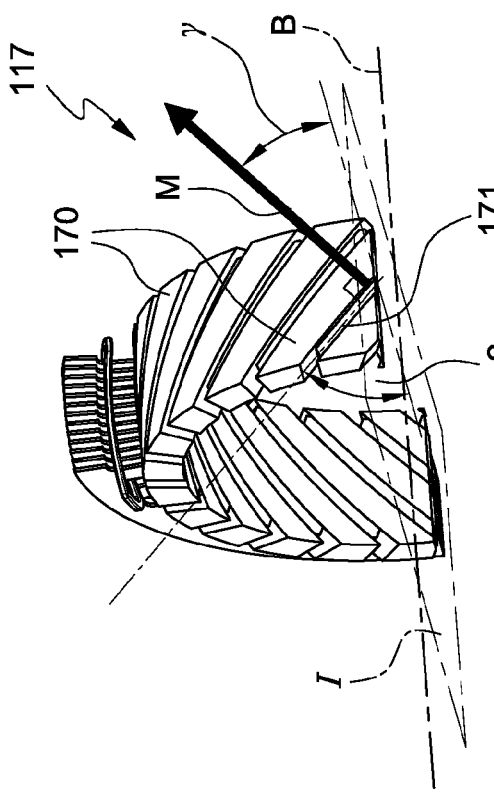
FIGS. 9 and 10 are different perspective section views of the first detail of FIG. 8.
Figure 10:
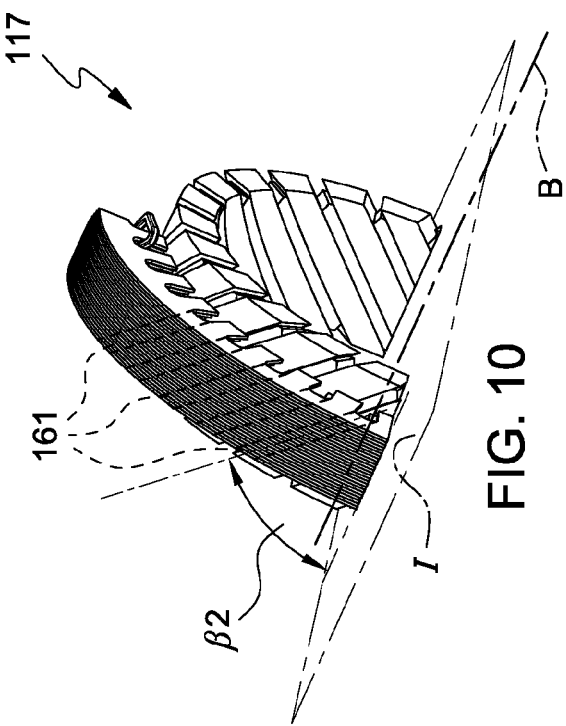
Figure 8:
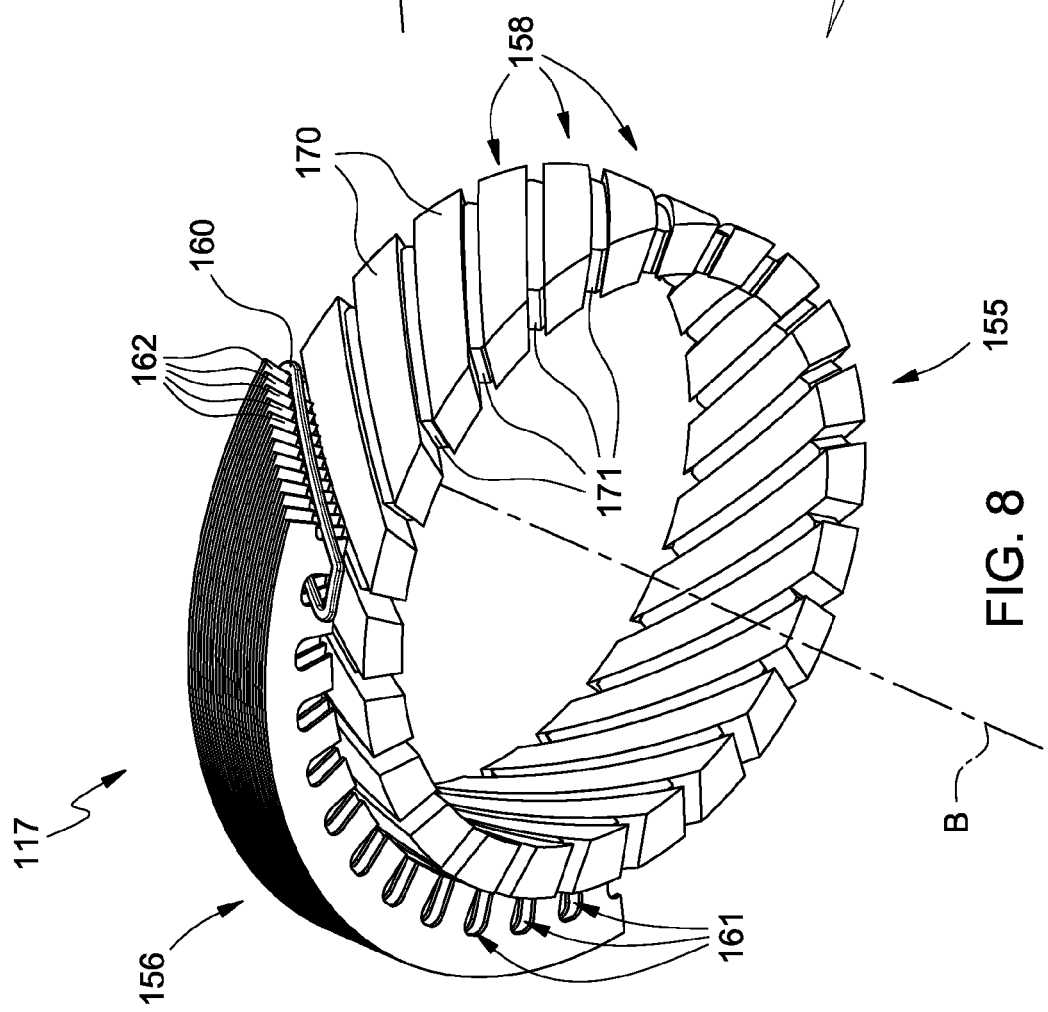
FIG. 8 is a perspective view, with parts removed for clarity, of a first detail of the hydroelectric unit of FIG. 4 according to a variant of the present invention.

In FIGS. 8-10 is illustrated a motor/generator 117 which differs from the motor/generator 17. The hydraulic machine 14 is substantially identical to the one already described.

In the following reference numbers used for FIGS. 1-7 are used for indicating similar or identical parts.

The motor/generator 117 comprises an annular rotor 155 coupled to the impeller 18 (not shown in FIGS. 8-10) and an annular stator 156 arranged, at a distance, about the annular rotor 155. The annular rotor 155 comprises a plurality of rotor poles 158, while the annular stator 156 comprises a plurality of stator windings 160 (not all visible in the attached figures) and a plurality of stator slots 161 (not all visible in the attached figures) configured to guide the magnetic flux and to house respective stator windings 160.

In particular, the annular stator 156 comprises a plurality of laminations 162, which are stacked along the longitudinal axis B and are shaped to define the plurality of stator slots 161.

The rotor poles 158 are distributed along the outer surface 25 of the annular casing 24 of the impeller 18 and are arranged parallel one to another.

In the non-limiting example here disclosed and illustrated, the rotor poles 158 comprises a plurality of iron-pole pieces 170 and a plurality of permanent magnets 171, which are arranged between the iron-pole pieces 170.

Preferably, each iron-pole piece 170 is in contact with the permanent magnets 171 between which it is arranged.

Permanent magnets 171 are preferably substantially parallelepiped block shape having radial dimensions greater than circumferential dimensions.

Permanent magnets 171 protrude from the outer surface 25 of the annular casing 24 of the impeller 18 (not shown in FIGS. 8-10) substantially orthogonally to the outer surface 25.

Iron-pole pieces 170 are made of soft magnetic material that guide the magnetic flux toward the stator 156 through the gap between the stator 156 and the rotor 155.

Iron-pole pieces 170 protrude from the outer surface 25 of the annular casing 24 of the impeller 18.

Figure 11:
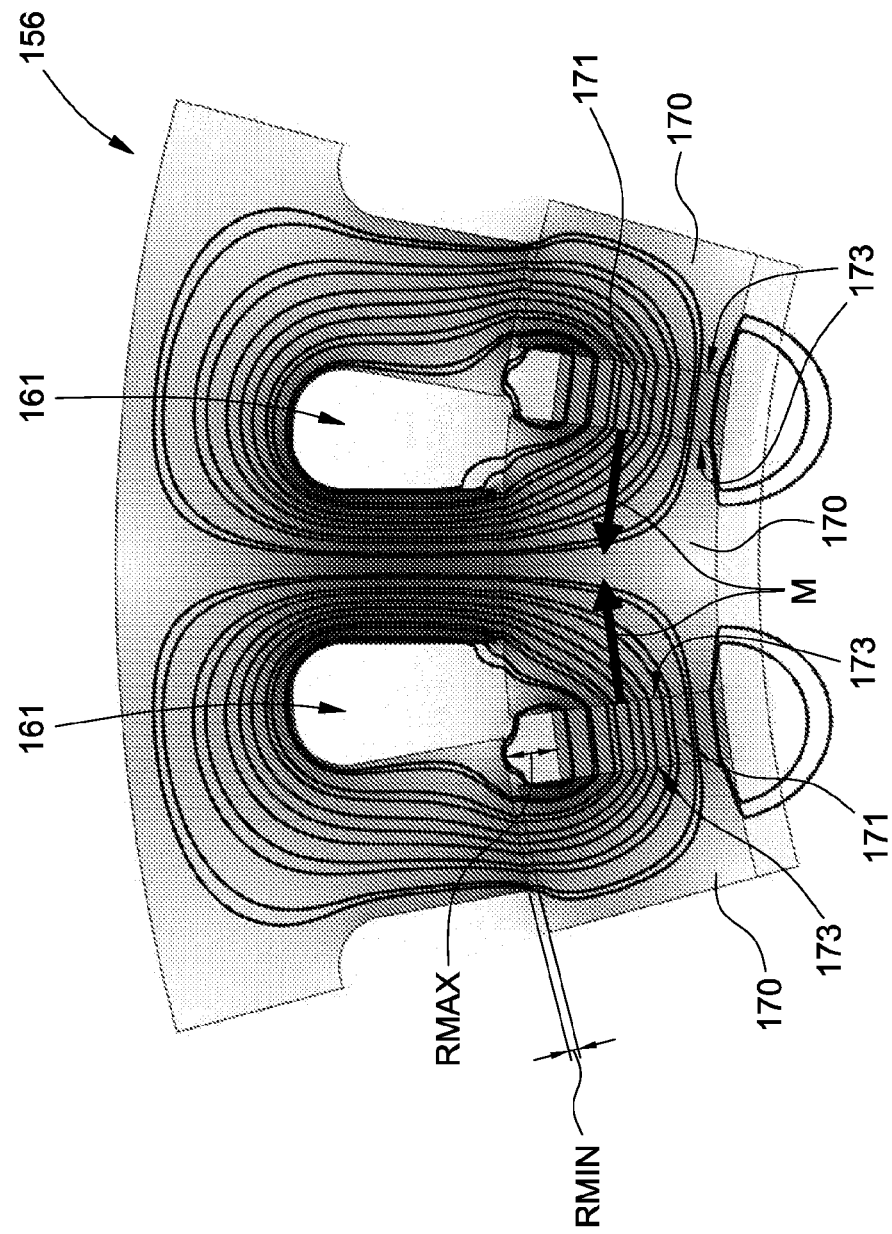
FIG. 11 is schematic representation of the magnetic flux density in a portion of the first detail of the hydroelectric unit of FIG. 8 during its operation.

With reference to FIG. 11, preferably, iron-pole pieces 170 are dimensioned to have radial dimensions greater than the radial dimensions of the permanent magnets 171. In this way, the gap between the stator 156 and the rotor 155 has a maximum radial extension RMax in correspondence of the permanent magnets 171 and a minimum radial extension RMin in correspondence of the iron-pole pieces 170.

According to a variant not shown, the permanent magnets and the iron-pole pieces are embedded in a protective material to prevent corrosion.

With reference to FIGS. 9 and 11, in the non-limiting example here disclosed and illustrated, each permanent magnet 171 is configured to have a magnetization direction M extending along a direction, which, in use, is orthogonal to the faces 173 (see FIG. 11) of the permanent magnets 171 facing the iron-pole pieces 170 and forms an angle γ with the plane I containing the longitudinal axis B (see FIG. 9).

The effect of the magnetization direction M is clearly visible in FIG. 11, wherein the magnetic flux density and the magnetic flux streamlines are represented on the electric motor/generator 117 in an operating status.

With particular reference to FIG. 9, analogously to rotor poles 58, the rotor poles 158 are arranged parallel one to another and extend transversal to a plane I containing the longitudinal axis B forming a first angle α2 with said plane I containing the longitudinal axis B. Preferably, the rotor poles 158 are also transversal to a plane orthogonal to the longitudinal axis B.

In the non-limiting example here disclosed and illustrated, both the iron-pole pieces 170 and the permanent magnets 171 are arranged parallel one to another and extend transversal to a plane I containing the longitudinal axis B forming a first angle α2 with said plane containing the longitudinal axis B.

Therefore angle γ is substantially equal to 90°-α2.

In the non-limiting example here disclosed and illustrated, the first angle α2 is measured substantially at half the axial length of the rotor 155. In other words, the first angle α2 is measured substantially in correspondence of a median plane transverse to the longitudinal axis A and separating the rotor 155 in two substantially equal parts.

Depending on the geometric configuration of rotor poles 158 (e.g. non-helix configurations), in fact, the first angle α2 may vary along the axial direction.

With particular reference to FIG. 10, the stator slots 161 are arranged parallel one to another and extend transversal to the plane I containing the longitudinal axis B forming a second angle β2 with said plane I containing the longitudinal axis B. Preferably, the stator slots 161 are also transversal to a plane orthogonal to the longitudinal axis B.

In the non-limiting example here disclosed and illustrated, the first angle α2 and the second angle β2 angle are substantially identical. With the definition "substantially identical" is intended that the difference between the first angle α2 and the second angle β2 can be comprised in a range ±5°.

Analogously to what stated before, according to a variant not shown the difference between the first angle α2 and the second angle β2 may be adjusted in order to mitigate the torque and axial load ripples. For example, the difference between the first angle α2 and the second angle β2 can be adjusted in a range ±10°.

The first angle α2 and the second angle β2 are defined so that magnetic interaction between the stator 156 and the rotor 155 of the generator/motor 117 create a generator axial load (i.e. along the longitudinal axis B) on the impeller 18 that opposes to the natural axial load created by hydrodynamic forces acting on the blades 21 of the impeller 18 during the operation of the hydroelectric unit 112 itself in nominal operating conditions or in a selected set of operating regimes.

Therefore, the configuration of the rotor 155 and of the stator 156 creates a counterforce that axially de-loads the impeller 18 of the hydraulic machine 14 during its operation.

Preferably, the first angle α2 and the second angle β2 are defined to create a generator axial load on the impeller 18, which has substantially a value at least equal to 50% of the module of the natural axial load.

More preferably, the first angle α2 and the second angle β2 are defined to create a generator axial load on the impeller 18, which has substantially a value equal to the module of the natural axial load.

The first angle α2 and the second angle β2 are calculated as a function of the torque of the motor/generator 117 in a selected operating regime and of the dimensions of the rotor 155.

In particular, the first angle α2 and the second angle β2 are calculated according the following formula:

$$\frac{\alpha 2 + \beta 2}{2} \geq \tan^{-1}\left(\frac{R}{\tau} \cdot \frac{1}{2} L\right)$$

wherein:
R is the average radius of the gap between the stator 156 and the rotor 155 measured at the rotor poles 158;
τ is the torque of the motor/generator 117 in a selected operating regime;
L is the natural axial load acting on the impeller 18 in a selected operating regime.

In the non-limiting example here disclosed and illustrated, wherein the first angle α2 and the second angle β2 are defined to create a generator axial load on the impeller 18, which has substantially a value equal to the module of the natural axial load, the first angle α2 and the second angle β2 are calculated according the following formula:

$$\frac{\alpha 2 + \beta 2}{2} \cong \tan^{-1}\left(\frac{R}{\tau} \cdot L\right)$$

In particular, with the expression "substantially equal" is intended that the first angle α2 and the second angle β2 satisfy the following condition:

$$\tan^{-1}\left(\frac{R}{\tau} \cdot L \cdot 0,9\right) \leq \frac{\alpha 2 + \beta 2}{2} \leq \tan^{-1}\left(\frac{R}{\tau} \cdot L \cdot 1.1\right)$$

According to a variant not shown, the rotor of the motor/generator comprises a rotor core and the rotor poles comprise a plurality of permanent magnets embedded in said rotor core; the rotor core is substantially annular and is provided with a core inner surface; the core inner surface being coupled to the outer surface of the annular casing of the impeller.

Advantageously, the claimed solution allows to use smaller, lighter and cheaper thrust bearings 33 for the hydraulic machine 14. Thanks to the reduction of the axial thrusts on the thrust bearings 33 in nominal operating conditions or in a selected set of operating regimes, in fact, the thrust bearings 33 of the hydraulic machine 14 are subjected to lower wearing rates.

With reference again to FIGS. 1 and 2, in use, energy is stored when the working liquid is pumped upward, if the working liquid is denser than the environmental liquid, or downward, if the environmental liquid is denser than the working liquid.

In the non-limitative example here disclosed and illustrated, the working liquid is denser than the body of water. Therefore, energy is stored when the working liquid is pumped upward (as illustrated in FIG. 2) and energy is released when the working liquid is let flowing downward (as illustrated in FIG. 1).

In particular, in the "charge" phase (configuration of FIG. 2), energy is provided from the energy source 180 (schematically illustrated) to the at least one motor/generator 17 or 117 to activate the at least one hydraulic machine 14 of the hydraulic assembly 6 that pumps the working liquid from the bottom reservoir 3 to the head reservoir 2 through the connecting conduit 4.

In the "discharge phase" (configuration of FIG. 1) the working liquid flows down from the head reservoir 2 along the connecting conduit 4 through the at least one hydraulic assembly 6 and accumulates into the bottom reservoir 3.

The energy produced during the passage through the hydraulic assembly 6 is converted by the motor/generator 17 or 117 and is transported to the grid 181 or to a different storage, for example onshore. This may be done for example by direct electric cable connection or by transporting energy first to an intermediate unit 182 and then to the grid 181. The intermediate unit 182 can be a buoyant unit.

Electric cable connection is obtained by floating or submersible cables 183.

The energy storage plant 1 comprises also a control system (not illustrated) configured to control and regulate the hydraulic assemblies 6, the valve 10, the motor/generator 17 117 and other controllable elements of the plant 1.

Optionally, the energy storage plant 1 can also comprise a cooling system configured to cool the working fluid if the temperature of the working fluid is greater than a threshold value (e.g. due to the friction along pipes or turbine/pump).

Finally, it is clear that modifications and variants can be made to the hydraulic assembly, to the storage plant described herein without departing from the scope of the present invention, as defined in the appended claims.

The invention claimed is:
1. Hydroelectric unit (12) extending along a longitudinal axis (B) and comprising:
at least one rim-driven hydraulic machine (14) comprising an impeller (18) provided with at least two blades (21);
at least one motor/generator (17; 117) configured to selectively supply mechanical energy to the impeller (18) or convert mechanical energy produced by the impeller (18) into electricity; the motor/generator (17; 117) comprising an annular rotor (55; 155) arranged about the impeller (18) and an annular stator (56; 156) arranged, at a distance, about the annular rotor (55; 155); the annular rotor (55; 155) being coupled to the impeller (18) and comprising a plurality of rotor poles (58; 158), which are distributed along an annular surface (63; 25), are arranged parallel one to another and extend transversal to a plane (I) containing the longitudinal axis (B) forming a first angle (α1; α2) with the plane (I) containing the longitudinal axis (B); the annular stator (56; 156) comprising a plurality of stator windings (60; 160) and a plurality of stator slots (61; 161) configured to guide the magnetic flux and to house respective stator windings (60; 160); the stator slots (61; 161) being arranged parallel one to another and extending transversal to a plane (I) containing the longitudinal axis (B) forming a second angle (β1; β2) with the plane (I) containing the longitudinal axis (B); wherein the first angle (α1; α2) and the second angle (β1; β2) are calculated according the following formula:

$$\frac{(\alpha 1; \alpha 2) + (\beta 1; \beta 2)}{2} \geq \tan^{-1}\left(\frac{R}{\tau} \cdot \frac{1}{2}L\right)$$

wherein:
- R is the average radius of the gap between the stator (56; 156) and the rotor (55; 155) measured at the rotor poles (58; 158);
- τ is the torque of the motor/generator (17; 117) in a selected operating regime;
- L is the natural axial load acting on the impeller (18) in a selected operating regime.

2. Hydroelectric unit according to claim 1, wherein the rotor poles (58; 158) comprise permanent magnets (66; 171).

3. Hydroelectric unit according to claim 1, wherein the annular stator (56; 156) comprises a plurality of laminations (62, 162), which are stacked along the longitudinal axis (B) and are shaped to define the plurality of stator slots (61; 161).

4. Hydroelectric unit according to claim 1, wherein the rotor poles (58; 158) are transversal to a plane orthogonal to the longitudinal axis (B).

5. Hydroelectric unit according to claim 1, wherein the stator slots (61; 161) are transversal to a plane orthogonal to the longitudinal axis (B).

6. Hydroelectric unit according to claim 1, wherein the first angle (α1; α2) and the second angle (β1; β2) are substantially identical.

7. Hydroelectric unit according to anyone of claim 1, wherein the first angle (α1; α2) and the second angle (β1; β2) are different one from the other; the difference between the first angle (α1; α2) and the second angle (β1; β2) has a value calculated so as to mitigate the torque and axial load ripples.

8. Hydroelectric unit (12) extending along a longitudinal axis (B) and comprising:
- at least one rim-driven hydraulic machine (14) comprising an impeller (18) provided with at least two blades (21);
- at least one motor/generator (17; 117) configured to selectively supply mechanical energy to the impeller (18) or convert mechanical energy produced by the impeller (18) into electricity; the motor/generator (17; 117) comprising an annular rotor (55; 155) arranged about the impeller (18) and an annular stator (56; 156) arranged, at a distance, about the annular rotor (55; 155); the annular rotor (55; 155) being coupled to the impeller (18) and comprising a plurality of rotor poles (58; 158), which are distributed along an annular surface (63; 25), are arranged parallel one to another and extend transversal to a plane (I) containing the longitudinal axis (B) forming a first angle (α1; α2) with the plane (I) containing the longitudinal axis (B); the annular stator (56; 156) comprising a plurality of stator windings (60; 160) and a plurality of stator slots (61; 161) configured to guide the magnetic flux and to house respective stator windings (60; 160); the stator slots (61; 161) being arranged parallel one to another and extending transversal to a plane (I) containing the longitudinal axis (B) forming a second angle (β1; β2) with the plane (I) containing the longitudinal axis (B);
- wherein the first angle (α1; α2) and the second angle (β1; β2) are defined so that magnetic interaction between the stator (56; 156) and the rotor (55; 155) of the generator/motor (17; 117) creates a generator axial load on the impeller (18) that opposes to the natural axial load created by hydrodynamic forces acting on the blades (21) of the impeller (18) during the operation of the hydroelectric unit (12) itself in nominal operating conditions or in a selected set of operating regimes.

9. Hydroelectric unit according to claim 8, wherein the first angle (α1; α2) and the second angle (β1; β2) are defined to create a generator axial load on the impeller (18), which has substantially a value at least equal to 50% of the absolute value of the natural axial load.

10. Hydroelectric unit according to claim 9, wherein the first angle (α1; α2) and the second angle (β1; β2) are defined to create a generator axial load on the impeller (18), which has substantially a value equal to the absolute value of the natural axial load.

11. Hydroelectric unit according to claim 8, wherein definition of the first angle (α1; α2) and the second angle (β1; β2) are functions of the torque of the motor/generator (17; 117) in a selected operating regime and of the dimensions of the rotor (55; 155).

12. Hydroelectric unit (12) extending along a longitudinal axis (B) and comprising:
- at least one rim-driven hydraulic machine (14) comprising an impeller (18) provided with at least two blades (21);
- at least one motor/generator (17; 117) configured to selectively supply mechanical energy to the impeller (18) or convert mechanical energy produced by the impeller (18) into electricity; the motor/generator (17; 117) comprising an annular rotor (55; 155) arranged about the impeller (18) and an annular stator (56; 156) arranged, at a distance, about the annular rotor (55; 155); the annular rotor (55; 155) being coupled to the impeller (18) and comprising a plurality of rotor poles (58; 158), which are distributed along an annular surface (63; 25), are arranged parallel one to another and extend transversal to a plane (I) containing the longitudinal axis (B) forming a first angle (α1; α2) with the plane (I) containing the longitudinal axis (B); the annular stator (56; 156) comprising a plurality of stator windings (60; 160) and a plurality of stator slots (61; 161) configured to guide the magnetic flux and to house respective stator windings (60; 160); the stator slots (61; 161) being arranged parallel one to another and extending transversal to a plane (I) containing the longitudinal axis (B) forming a second angle (β1; β2) with the plane (I) containing the longitudinal axis (B);
- wherein the first angle (α1; α2) and the second angle (β1; β2) are calculated according the following formula:

$$\frac{(\alpha 1; \alpha 2) + (\beta 1; \beta 2)}{2} \cong \tan^{-1}\left(\frac{R}{\tau} \cdot L\right)$$

wherein:
- R is the average radius of the gap between the stator (56; 156) and the rotor (55; 155) measured at the rotor poles (58; 158);
- τ is the motor/generator torque in a selected operating regime;
- L is the natural axial load acting on the impeller (18) in a selected operating regime.

13. Hydroelectric unit according to claim 1, wherein the impeller (18) comprises an annular casing (24) provided with an outer surface (25) and an inner surface (26); the blades (21) protruding radially from the inner surface (26) of the annular casing (24).

14. Hydroelectric unit according to claim 13, wherein the rotor (55) comprises a back ring (59) comprising a ring outer surface (63) and a ring inner surface (64); the rotor poles (58) being distributed along the ring outer surface (63).

15. Hydroelectric unit according to claim 14, wherein the rotor poles (58) comprise permanent magnets (66) arranged on the ring outer surface (63) protruding from said ring outer surface (63).

16. Hydroelectric unit according to claim 15, wherein each permanent magnet (66) is configured to have a magnetization direction (M) extending along a radial direction with respect of the longitudinal axis (B).

17. Hydroelectric unit according to claim 13, wherein the rotor (55; 155) comprises a rotor core and the rotor poles (58; 158) comprise a plurality of permanent magnets embedded in said rotor core; the rotor core is substantially annular.

18. Hydroelectric unit according to claim 13, wherein the rotor poles (158) comprises a plurality of iron-pole pieces (170) and a plurality of permanent magnets (171), which are arranged between the iron-pole pieces (170).

19. Hydroelectric unit according to claim 18, wherein each iron-pole piece (170) is in contact with the permanent magnets (171) between which it is arranged.

20. Hydroelectric unit according to claim 18, wherein the rotor poles (158) are distributed along the outer surface (25) of the annular casing (24) of the impeller (18).

21. Hydroelectric unit according to claim 18, wherein each permanent magnet (171) is configured to have a magnetization direction (M) which is orthogonal to the faces (173) of the permanent magnets (171) facing, in use, the iron-pole pieces (170), forming a third angle (γ) with the plane (I) containing the longitudinal axis (B).

22. Hydroelectric unit according to claim 1, wherein the impeller (18) and the motor/generator (17; 117) are coaxial.

23. Hydroelectric unit according to claim 1, wherein the impeller comprises at least one water lubricated thrust bearing (33).

24. Hydroelectric unit according to claim 23, wherein the at least one water lubricated thrust bearing (33) is an annular thrust bearing arranged in a central hollow hub (22) of the impeller (18).

25. Submersible hydraulic assembly for an energy storage plant (1) comprising at least one hydroelectric unit (12) as claimed in claim 1.

26. Energy storage plant comprising:
at least one head reservoir (2) for storing a working fluid; the head reservoir (2) being arranged at a first height;
at least one bottom reservoir (3) for storing the working fluid; the bottom reservoir (3) being arranged at a second height lower than the first height and being submersed in an environmental liquid;
at least one connecting conduit (4), fluidly connecting the head reservoir (2) and the bottom reservoir (3);
at least one submersible hydraulic assembly (6) as claimed in claim 25; the submersible hydraulic assembly (6) being arranged along the connecting conduit (4) to intercept the working fluid flowing between the head reservoir (2) and the bottom reservoir (3); the submersible hydraulic assembly (6) being submersed in the environmental liquid.

\* \* \* \* \*